United States Patent
Fukuhara et al.

(10) Patent No.: US 11,470,213 B2
(45) Date of Patent: Oct. 11, 2022

(54) IMAGE FORMING APPARATUS

(71) Applicant: CANON KABUSHIKI KAISHA, Tokyo (JP)

(72) Inventors: Riki Fukuhara, Tokyo (JP); Takashi Yokoya, Tokyo (JP); Toshifumi Oikawa, Tokyo (JP); Yutaka Ando, Tokyo (JP); Akinobu Nishikata, Tokyo (JP); Koji Yumoto, Tokyo (JP); Yuichiro Oda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/245,391

(22) Filed: Apr. 30, 2021

(65) Prior Publication Data

US 2021/0368055 A1 Nov. 25, 2021

(30) Foreign Application Priority Data

May 19, 2020 (JP) .............................. JP2020-087137

(51) Int. Cl.
*H04N 1/46* (2006.01)
*H04N 1/00* (2006.01)

(52) U.S. Cl.
CPC ..... *H04N 1/00803* (2013.01); *H04N 1/00031* (2013.01); *H04N 1/00045* (2013.01); *H04N 1/00734* (2013.01); *H04N 1/00816* (2013.01); *H04N 1/00819* (2013.01)

(58) Field of Classification Search
None
See application file for complete search history.

(56) References Cited

U.S. PATENT DOCUMENTS

| 7,760,370 | B2 | 7/2010 | Oki | |
| 8,515,299 | B2* | 8/2013 | Kooriya | G03G 15/0136 399/72 |
| 2005/0207768 | A1* | 9/2005 | Suzuki | G03G 15/5062 399/49 |
| 2007/0189789 | A1* | 8/2007 | Suzuki | G03G 15/5062 399/49 |
| 2010/0302597 | A1* | 12/2010 | Sugiyama | G06K 15/02 358/3.27 |
| 2018/0165044 | A1* | 6/2018 | Tanaka | G06F 3/1208 |
| 2021/0382421 | A1* | 12/2021 | Yumoto | H04N 1/00588 |

* cited by examiner

*Primary Examiner* — Dung D Tran
(74) *Attorney, Agent, or Firm* — Rossi, Kimms & McDowell LLP

(57) ABSTRACT

An image forming apparatus according to the present disclosure includes an image forming unit configured to form an image based on an image forming condition; a reading unit configured to read a test image on a sheet; a controller configured to: control the image forming unit to form the test image; obtain read data related to the test image output from the reading unit is formed; and update the image forming condition based on the read data. The controller operates in a first mode and a second mode, the first mode is a mode in which, the controller controls the image forming unit to form the image for the second sheet after the image forming condition is updated based on the reading data related to the test image.

9 Claims, 8 Drawing Sheets

| PAGE ID |
| --- |
| SHEET WIDTH [mm] |
| SHEET LENGTH [mm] |
| BASIS WEIGHT [gsm] |
| SHEET TYPE |
| SHEET FEEDING DECK ID |
| ADJUSTMENT IMAGE PRINT INFORMATION |
| ⋮ |

FIG. 6A

| SHEET FEEDING DECK ID |
| --- |
| IMAGE FORMING PARAMETER 1 |
| IMAGE FORMING PARAMETER 2 |
| IMAGE FORMING PARAMETER 3 |
| ⋮ |

FIG. 6B

IMAGE FORMING APPARATUS

BACKGROUND OF THE INVENTION

Field of the Invention

The present invention relates to an image forming apparatus, such as a printer, a copying machine, a facsimile, and a multifunction apparatus.

Description of the Related Art

As to printed matters printed by a commercial printing machine, it is desirable to stabilize printing position accuracy is required for both a back surface and front surface. U.S. Pat. No. 7,760,370 B2 discloses an image forming apparatus which stabilizes the printing position accuracy. In the image forming apparatus, in order to stabilize the print position accuracy, an adjustment image, which serves as a mark of a print position (a position at which an image is formed) is printed on a sheet to create the adjustment chart. The adjustment image on the adjustment chart is read by an image reading sensor provided in a sheet conveyance path. The image forming apparatus adjusts a print position by feeding back a reading result of the adjustment image to an image forming condition.

After forming the adjustment image on the sheet, a predetermined time is required to feed back the reading result of the adjustment image to the image forming condition. This causes a decrease in productivity. For example, when binding printed matters, the image forming condition is updated, immediately before the image forming of the first page, based on the reading result of the adjustment chart. Therefore, as to the image forming immediately after generating the adjustment chart, it is necessary to wait for an update of the image forming conditions before forming the image. Further, when printing a large number of sheets, a timing of updating the image forming conditions is not restricted, and the image forming conditions are updated at predetermined intervals. Therefore, the image quality of the printed matter is maintained. However, in this case, as to the image forming immediately after generating the adjustment chart, it is necessary to wait for an update of the image forming condition before forming the image. In either case, the productivity is decreased since the image formation needs to wait until the image forming condition is updated. In view of the above, one object of the present invention is to provide an image forming apparatus in which it is possible, when the image forming conditions are updated, to select maintaining of the image quality or prevention of a decrease in productivity.

SUMMARY OF THE INVENTION

An image forming apparatus according to the present disclosure including: an image forming unit configured to form an image based on an image forming condition; a reading unit configured to read a test image on a sheet; a controller configured to: control the image forming unit to form the test image while a plurality of images is formed by the image forming unit, the test image and the plurality of images being formed on separate sheets; obtain read data related to the test image output from the reading unit is formed; and update the image forming condition based on the read data, wherein the controller operates in a first mode and a second mode, wherein the first mode is a mode in which, in a case where the test image is formed between an image for a first sheet and an image for a second sheet which is subsequent to the first sheet, the controller controls the image forming unit to form the image for the second sheet after the image forming condition is updated based on the reading data related to the test image, and wherein the second mode is a mode in which, in a case where the test image is formed between an image for a third sheet and an image for a fourth sheet which is subsequent to the third sheet, the controller controls the image forming unit to start forming of the image for the fourth sheet before the image forming condition is updated based on the reading data related the test image.

Further features of the present invention will become apparent from the following description of exemplary embodiments (with reference to the attached drawings).

BRIEF DESCRIPTION OF THE DRAWINGS

FIG. 6A is an explanatory diagram of page information and FIG. 68 is an explanatory diagram of image forming parameter information.

DESCRIPTION OF THE EMBODIMENTS

At least one embodiment of the present disclosure is described below in detail with reference to the drawings.
<Image Processing System>

Figure 1:
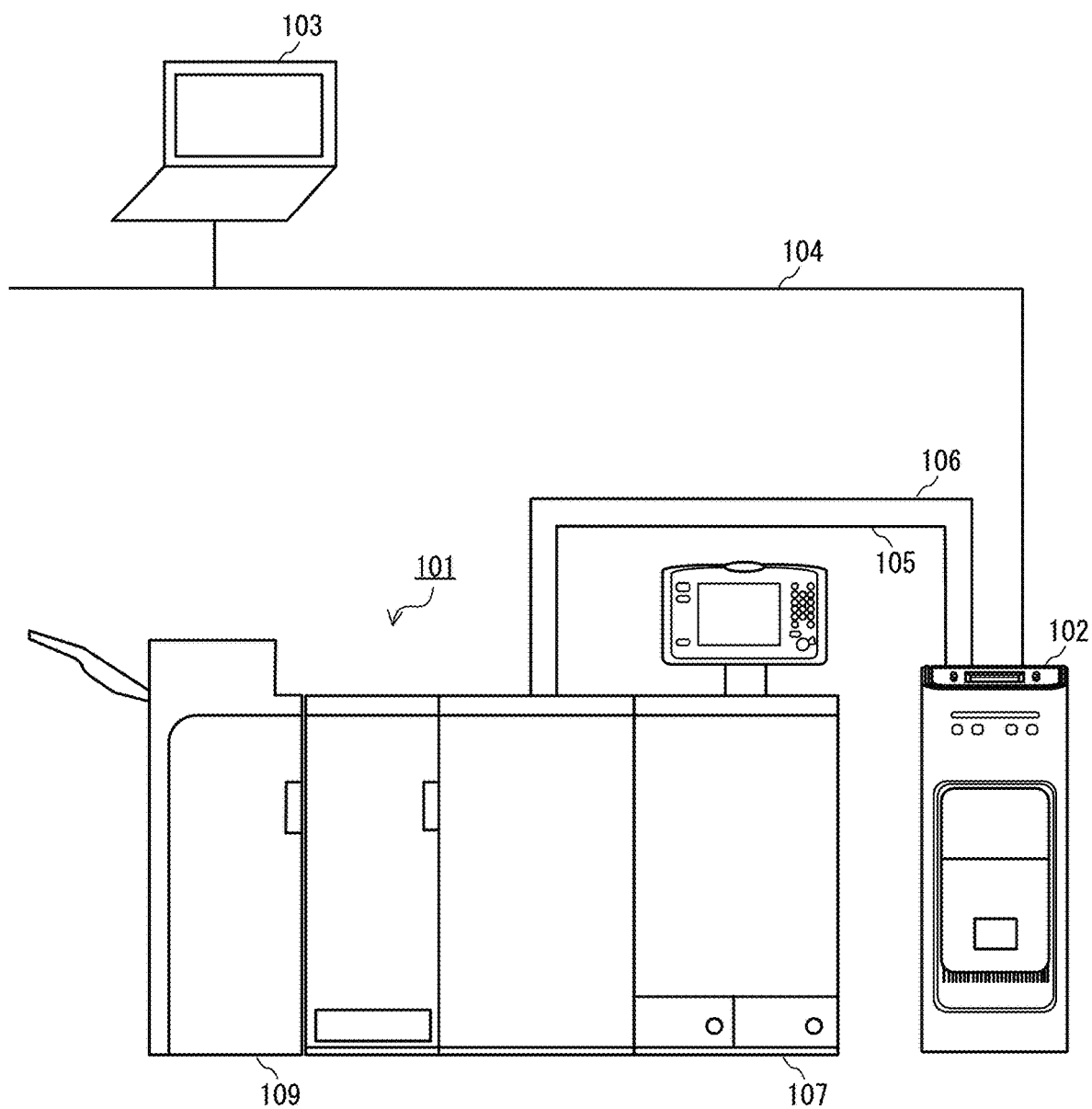
FIG. 1 is a configuration diagram of an image processing system.

FIG. 1 is a configuration diagram of an image processing system including an image forming apparatus of the present embodiment. The image processing system is equipped with an image forming apparatus 101 and an external controller 102. The image forming apparatus 101 is a multifunction apparatus, a multi-function peripheral (MFP) or the like, for example. The external controller 102 is an image processing controller, a digital front end (DFE), a print server or the like, for example.

The image forming apparatus 101 and the external controller 102 are communicably connected via an internal LAN (Local Area Network) 105 and a video cable 106. The external controller 102 is connected to a client PC (Personal Computer) 103 via an external LAN 104. The external controller 102 obtains a print instruction (print job) from the client PC 103. The print job includes image data representing an image formed on a sheet and page information corresponding to the image data.

A printer driver, having a function of converting print data into a print description language which can be processed by the external controller 102, is installed in the client PC 103. A user can issue an instruction for printing from various applications via the printer driver. The printer driver transmits print data to the external controller 102 based on a print instruction from the user. The external controller 102 receives a print instruction including print data from the client PC 103. The external controller 102 performs data analysis and rasterization processing on the received print instruction and instructs the image forming apparatus 101 to print (image forming) of an image based on the print data.

The image forming apparatus 101 is configured by connecting a plurality of devices, each having different functions, including a printing apparatus 107. Further, the image forming apparatus 101 can perform a complicated printing process such as bookbinding. The image forming apparatus 101 of the present embodiment includes a printing apparatus 107 and a finisher 109. The printing apparatus 107 uses a developing agent (for example, toner) to form an image on the sheet fed from a sheet feeding unit provided in a lower part of a main body. The printing apparatus 107 forms a yellow (Y), magenta (M), cyan (C), and black (K) image. On the sheet, a full-color image in which images of each color are superimposed is formed. The sheet on which the image is formed is conveyed from the printing apparatus 107 to the finisher 109. The finisher 109 loads the sheet on which the image is formed.

In the configuration of the image processing system of the present embodiment, the external controller 102 is connected to the image forming apparatus 101, however, the external controller 102 may be omitted. The image forming apparatus 101 may be configured to directly obtain the print instruction including print data from the client PC 103 via the external LAN 104. In this case, data analysis processing and rasterization processing, which are performed by the external controller 102, are performed by the image forming apparatus 101. This means that the image forming apparatus 101 and the external controller 102 may be integrally configured.

<System Configuration>

Figure 2:
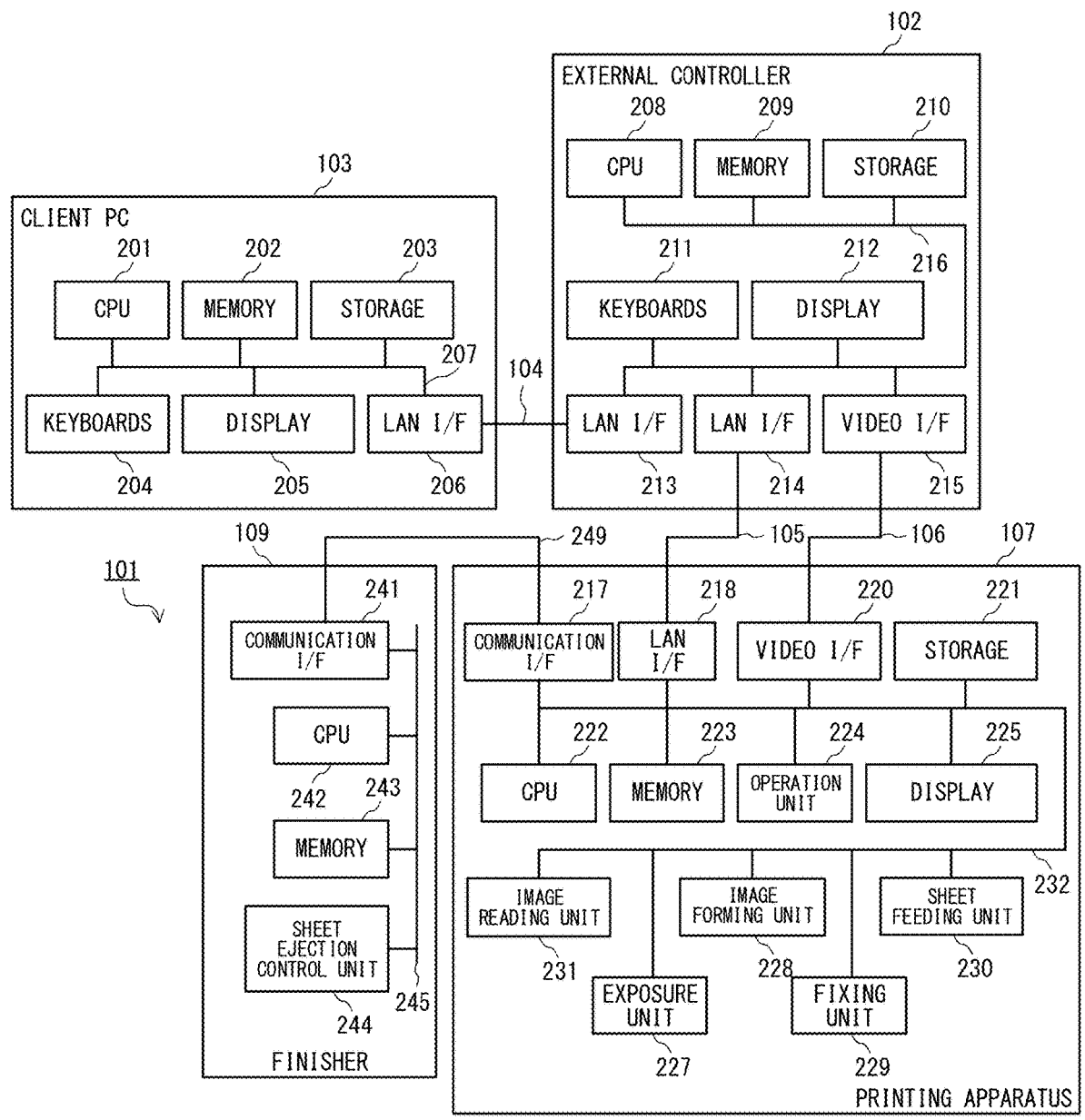
FIG. 2 is a configuration diagram of a system.

FIG. 2 is a system configuration diagram for controlling an operation of the image processing system. Here, the controller, which is for controlling the operation of each of the image forming apparatus 101, the external controller 102, and the client PC 103, will be described.

Printing Apparatus

In order to communicate with other devices, the printing apparatus 107 includes a communication interface (I/F) 217, a LAN I/F 218, and a video I/F 220. In order to control the operation of the printing apparatus 107, the printing apparatus 107 includes a CPU (Central Processing Unit) 222, a memory 223, a storage 221, an image reading unit 231, an exposure unit 227, an image forming unit 228, a fixing unit 229, and a sheet feeding unit 230. The printing apparatus 107 includes an operation unit 224 and a display 225, each for a user interface. These components are communicably connected to each other via the system bus 232.

The communication I/F 217 is connected to the finisher 109 via a communication cable 249 to control communication with the finisher 109. When the printing apparatus 107 cooperates with the finisher 109, information and data are transmitted and received via the communication I/F 217. The LAN I/F 218 is connected to the external controller 102 via the internal LAN 105 to control communication with the external controller 102. The printing apparatus 107 receives print data or the like which represents settings at the time of printing from the external controller 102 via the LAN I/F 218. The video I/F 220 is connected to the external controller 102 via the video cable 106 to control communication with the external controller 102. The printing apparatus 107 receives image data or the like representing an image to be formed from the external controller 102 via the video I/F 220.

The CPU 222 comprehensively controls image processing and printing by executing a computer program stored in the storage 221. The memory 223 provides a work area for the CPU 222 to execute various processes. When performing an image forming process, the CPU 222 controls the exposure unit 227, the image forming unit 228, the fixing unit 229, and the sheet feeding unit 230.

The exposure unit 227 uniformly charges a surface of the photoconductor and irradiates a laser beam on the surface of the charged photoconductor based on the image data. The exposure unit 227 charges the surface of the photoconductor to a uniform negative potential. The exposure unit 227 outputs a laser beam by using a laser driver and scans the surface of a uniformly charged photoconductor by the laser beam while adjusting a reflection angle of the laser beam with a rotating multifaceted mirror. On the photoconductor, a potential at a position at which the laser beam is irradiated varies to form an electrostatic latent on the surface. Four photoconductors are provided corresponding to the four colors of yellow (Y), magenta (M), cyan (C), and black (K). Electrostatic latent images corresponding to images of different colors are formed on each of the four photoconductors.

The image forming unit 228 transfers the toner image formed on the photoconductor on the sheet. The image forming unit 228 includes a developer, a transfer unit, a toner replenishment unit, and the like. The developer forms the toner image by adhering negatively charged toner, provided from the developing cylinder, to the electrostatic latent image formed on the surface of the photoconductor. Corresponding to the four colors of yellow (Y), magenta (M), cyan (C), and black (K), four developers are provided. The developer visualizes the electrostatic latent image of the photoconductor with the toner of the corresponding color.

An intermediate transfer belt, provided in the transfer unit, transfers the toner image from the photoconductor on the intermediate transfer belt. At a position opposing to the photoconductor, with the intermediate transfer belt in between, a primary transfer roller is provided. By applying a positive potential to the primary transfer roller, from each of the four photoconductors, the toner image is superimposed and transferred on the intermediate transfer belt. As a result, a full-color toner image is formed on the intermediate transfer belt. The toner image formed on the intermediate transfer belt is transferred to the sheet by a secondary transfer roller described later. By applying a positive potential to the secondary transfer roller, the full-color toner image is transferred from the intermediate transfer belt to the sheet.

The fixing unit 229 fixes die transferred toner image on the sheet. The fixing unit 229 heats and pressurizes the toner image on the sheet to melt and fix the same on the sheet. Thereby the image is formed on the sheet. To control feeding operations of the sheet, the sheet feeding unit 230 is provided with rollers, such as a feeding roller, and various sensors in its feeding path.

The image reading unit 231 reads the image formed on the conveyed sheet based on an instruction from the CPU 222. When adjusting the image forming conditions, for example, the CPU 222 reads an adjustment image for adjusting the image forming conditions, which is formed on the sheet, using the image reading unit 231. The operation unit 224 is an input device which receives input of various settings and operation instructions from the user. The operation unit 224 is, for example, various input keys, a touch panel, or the like. The display 225 is an output device which displays setting information of the image forming apparatus 101, a processing status of the print job, and the like.

Finisher

Finisher 109 is, for example, a large-capacity stacker. The finisher 109 includes a communication I/F 241, a CPU 242, a memory 243, and a sheet ejection control unit 244. These components are communicably connected to each other via the system bus 245. The communication I/F 241 is connected to the printing apparatus 107 via a communication cable 249 and controls communication with the printing apparatus 107. When the finisher 109 and the printing apparatus 107 operate in cooperation with each other, information and data are transmitted and received via the communication I/F 241. The CPU 242 executes a control program stored in the memory 243 and performs various controls necessary for sheet ejection. The memory 243 stores the control program. The memory 243 also provides a work area for the CPU 242 to execute various processes. The sheet ejection control unit 244 conveys the conveyed sheets to the stack tray based on the instruction from the CPU 242.

External Controller

The external controller 102 includes a LAN I/F 213, a LAN I/F 214, and a video I/F 215 in order to communicate with other devices. The external controller 102 includes a CPU 208, a memory 209, and a storage 210 to control the operation of the external controller 102. The external controller 102 includes a keyboard 211 and a display 212, as user interfaces. These components are communicably connected to each other via the system bus 216.

The LAN I/F 213 is connected to the client PC 103 via the external LAN 104 and controls communication with the client PC 103. The external controller 102 obtains a print instruction or the like from the client PC 103 via LAN I/F 213. The LAN i/F 214 is connected to the printing apparatus 107 via the internal LAN 105 and controls communication with the printing apparatus 107. The external controller 102 transmits print data or the like, which represents the settings at the time of printing to the printing apparatus 107, via the LAN I/F 214. The video I/F 215 is connected to the printing apparatus 107 via the video cable 106 to control communication with the printing apparatus 107. The external controller 102 transmits image data or the like to the printing apparatus 107 via the video I/F 215.

By executing the computer program stored in the storage 210, the CPU 208 comprehensively performs processing such as receiving print data obtained from the client PC 103, RIP processing, and transmission of print data to the image forming apparatus 101. The memory 209 provides a work area for the CPU 208 to execute various processes. The keyboard 211 is an input device which receives input of various settings and operation instructions from the user. The display 212 is an output device which displays information, such as an execution application of the external controller 102, as a still image or a moving image.

Client PC

The client PC 103 includes a CPU 201, a memory 202, a storage 203, a keyboard 204, a display 205, and a LAN I/F 206. These components are communicably connected to each other via the system bus 207.

By executing the computer program stored in the storage 203, the CPU 201 controls the operation of the client PC 103. In the present embodiment, the CPU 201 creates print data and transmits print instructions. The memory 202 provides a work area for the CPU 201 to executes various processes. The keyboard 204 and the display 205 are user interfaces. The keyboard 204 is an input device which receives instructions from the user. The display 205 is an output device which displays information, such as an execution application of the client PC 103, as a still image or a moving image. The LAN I/F 206 is connected to the external controller 102 via the external LAN 104 to control communication with the external controller 102. The client PC 103 transmits a print instruction or the like to the external controller 102 by LAN I/F 206.

The external controller 102 and the image forming apparatus 101 are connected by the internal LAN 105 and the video cable 106. However, other configurations may be used as long as data necessary for printing can be transmitted and received, for example, these devices may be connected only via video cables. Each of the memory 202, the memory 209, the memory 223, and the memory 243 may be a storage device for holding data or programs, respectively. As to these memories, a volatile RAM (Random Access Memory), a non-volatile ROM (Read Only Memory), a storage device, a USB (Universal Serial Bus) memory and the like may be used.

<Structure of the Image Forming Apparatus>

Figure 3:
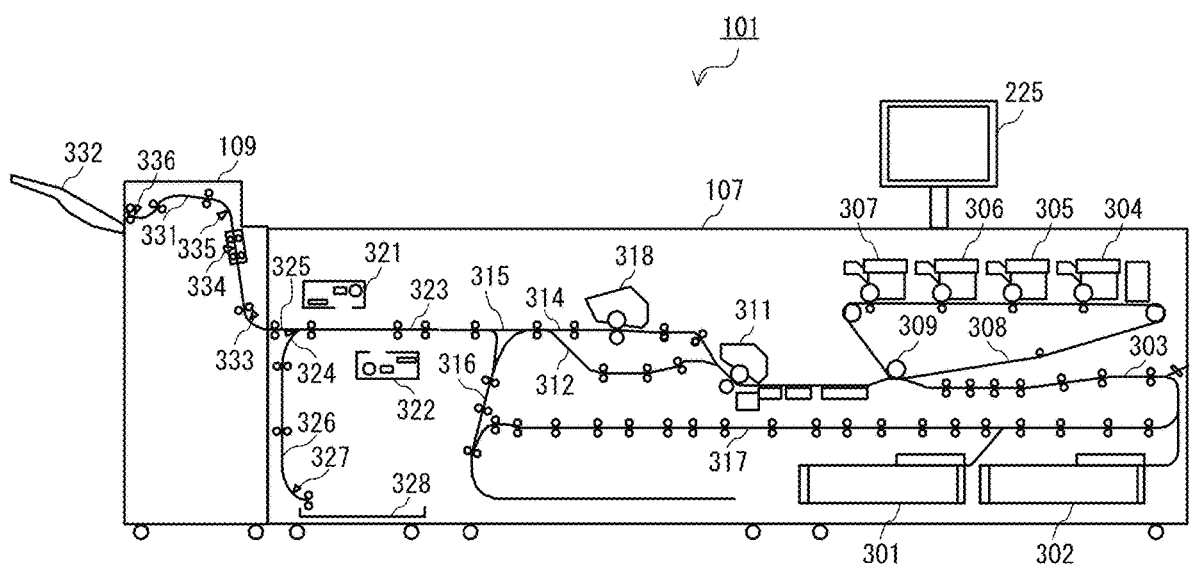
FIG. 3 is a configuration diagram of an image forming apparatus.

FIG. 3 is a configuration diagram of the image forming apparatus 101. A display 225 is provided on the upper part of the printing apparatus 107. The display 225 displays information for the printing status and settings of the image forming apparatus 101. The sheet on which the image is formed by the printing apparatus 107 is conveyed to the finisher 109 provided in the subsequent stage.

The printing apparatus 107 includes, as the sheet feeding unit 230, a plurality of sheet feeding decks 301, 302, and a conveyance path 303. Different types of sheets can be accommodated in the sheet feeding decks 301 and 302. As to the sheets accommodated in the sheet feeding decks 301 and 302, the topmost sheet is separated and fed to the conveyance path 303. The printing apparatus 107 includes, as the exposure unit 227, the image forming units 304, 305, 306, and 307 for forming an image. The printing apparatus 107 forms a color image. Therefore, the image forming unit 304 forms a black (K) image (the toner image). The image forming unit 305 forms an image of cyan (C) (the toner image). The image forming unit 306 forms a magenta (M) image (the toner image). The image forming unit 307 forms a yellow (Y) image (the toner image).

The printing apparatus 107 includes, as the image forming unit 228, a secondary transfer roller 309 and an intermediate transfer belt 308 on which the toner image is transferred from each of the image forming units 304, 305, 306, and 307. The intermediate transfer belt 308 rotates clockwise in FIG. 3, and the image is transferred on the intermediate transfer belt 308 by the image forming unit 307, the image forming unit 306, the image forming unit 305, and the image forming unit 304 in this order. As a result, a full-color toner image is formed on the intermediate transfer belt 308. The intermediate transfer belt 308 rotates to convey the toner image to the secondary transfer roller 309. The sheet is conveyed toward the secondary transfer roller 309 in synchronization with the timing when the toner image is conveyed to the secondary transfer roller 309. The secondary transfer roller 309 transfers the toner image on the intermediate transfer belt 308 on the conveyed sheet.

The printing apparatus 107 includes, as the fixing unit 229, a first fixing device 311 and a second fixing device 318. The first fixing device 311 and the second fixing device 318 have the same configuration and fix the toner image on the sheet. Therefore, each of the first fixing devices 311 and the second fixing device 318 includes a pressure roller and a heat roller, respectively. The sheet is heated and pressurized by passing between the pressure roller and the heat roller, thereby the toner image is melted and crimped. The sheet, after processed by the second fixing device 318, is conveyed to the conveyance path 314. The second fixing device 318 is arranged downstream of the first fixing device 311 in a sheet conveyance direction. The second fixing device 318 is used for adding gloss to the image on the sheet which is fixed by the first fixing device 311 and for improving a fixing characteristic. Therefore, the second fixing device 318 may be omitted depending on the type of the sheet and/or content of the image forming process. A conveyance path 312 is provided in order to convey the sheet fixed by the first fixing device 311 without passing through the second fixing device 318.

A conveyance path 315 and a reverse path 316 are arranged on the downstream side of a point where the conveyance path 314 and the conveyance path 312 are merged. When double-sided printing is instructed, the sheet is conveyed to the reverse path 316. The sheet conveyed to the reverse path 316, after its conveyance direction is reversed in the reverse path 316, is conveyed to the double-sided conveyance path 317. After passing the reverse path 316 and the double-sided conveyance path 317, a surface of the sheet on which the image is formed (first surface) is reversed. The sheet is conveyed to the conveyance path 303 via the double-sided conveyance path 317, and an image is formed on the second surface, which is a surface opposite to the first surface, by the secondary transfer roller 309 and the fixing unit 229.

In a case of single-sided printing, or in a case where images have been formed on both sides in the double-sided printing, the sheet is conveyed to the conveyance path 315. A conveyance path 323 is arranged on the downstream side of the conveyance path 315 in the sheet conveyance direction.

Figure 4:
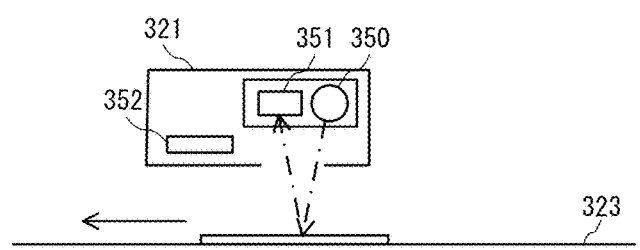
FIG. 4 is an explanatory diagram of a CIS.
Figure 4:
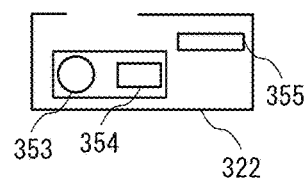

CISs (Contact Image Sensor) 321 and 322, as the image reading unit 231, are arranged on the conveyance path 323 so as to face each other with the conveyance path 323 in between. FIG. 4 is an explanatory diagram of the CIS 321 and 322. The CIS 321 is an optical sensor which reads an image of an upper surface (second surface) of the sheet which has been double-side printed and conveyed along the conveyance path 323. The CIS 322 is an optical sensor which reads an image of a lower surface (first surface) of the sheet which has been double-side printed and conveyed along the conveyance path 323.

The CIS 321 includes an LED (Light Emitting Diode) 350 as a light source, a reading sensor 351 as a light receiving unit, and a white reference plate 352. The LED 350 irradiates the upper surface of the sheet with light at the timing when the sheet conveyed along the conveyance path 323 reaches a reading position. The reading sensor 351 receives the light reflected by the sheet. The reading sensor 351 performs photoelectric conversion of the received reflected light and transmits the reading result, which is an electric signal, to the CPU 222. The image formed on the sheet is read in this way. The reading sensor 351 includes a plurality of light receiving elements (photoelectric conversion elements) in a direction orthogonal to the sheet conveying direction. Therefore, the direction orthogonal to the sheet conveying direction is a main scanning direction of the CIS 321. The white reference plate 352 is used when calibrating the CIS 321. The white reference plate 352 moves to a position where light is emitted from the LED 350 at the time of calibration and the reflected light is received by the reading sensor 351. CIS 321 is calibrated based on the reading result of the white reference plate 352.

Similar to the CIS 321, the CIS 322 includes an LED 353, a reading sensor 354, and a white reference plate 355. The CIS 322 operates, in the same manner as the CIS 321, to read an image formed on the lower surface of the sheet at the timing when the sheet conveyed along the conveyance path 323 reaches a reading position. The image reading unit 231 may be realized by a CCD sensor or a CMOS sensor as well as by CIS 321 and 322.

In the present embodiment, the adjustment image for adjusting the image forming conditions can be formed on both sides of the sheet. Hereinafter, the sheet on which the adjustment image is formed is referred to as "adjustment chart". The printing apparatus 107 prints the adjustment image on a sheet to generate the adjustment chart, and reads the adjustment image by CIS 321 and CIS 322. The reading result of the adjustment chart by CIS 321 and CIS 322 is stored in the memory 223. The CPU 222 refers to the memory 223 and feeds back the reading results read by CIS 321 and CIS 322 to the image forming conditions. Thereby the image forming condition is adjusted.

For example, when a temperature in the printing apparatus 107 rises, the position of the image formed on the sheet changes as compared to that formed on the sheet when the temperature in the printing apparatus 107 is relatively low. In this case, the printing apparatus 107 generates the adjustment chart, obtains a change amount based on the reading result of CIS 321 and 322, and sets the printing position based on the change amount such that the printing position remains the same as compared to the printing position when the temperature in the printing apparatus is relatively low. As a result, the printing apparatus 107 serves to stabilize the printing position accuracy.

The adjustment image formed on the adjustment chart is an image for adjusting the print position on the front and back surfaces of the sheet. However, the adjustment image may be an image for adjusting image forming conditions such as image density and color shift. The format of the adjustment image may be in either a format printed as the adjustment chart or a format in which the adjustment image is printed, in addition to the image instructed to be printed by the user, on the same sheet. In the present embodiment, a description is given for a case where the printing is performed as the adjustment chart.

The adjustment chart is separated so as not to be mixed in the printed matter corresponding to the print job. In order to achieve the above, the printing apparatus 107 includes a flapper 324, a discharge path 326, a conveyance sensor 327, and a discharge tray 328. The adjustment image on the adjustment chart is read by the CIS 321 and 322, and the adjustment chart is conveyed to the discharge path 326 by the flapper 324. The sheet conveyed to the discharge path 326 is discharged to the discharge tray 328.

In a case where the conveyed sheet is not the adjustment chart, the sheet is conveyed from the conveyance path 323 to a downstream conveyance path 325 by the flapper 324. The sheet conveyed to the downstream conveyance path 325 is conveyed to the finisher 109. In a case where the printing apparatus 107 receives a notification of an occurrence of a conveyance jam from the finisher 109, the printing apparatus 107 switches the flapper 324 to the discharge path 326 side, regardless of whether the sheet is the adjustment chart or not. Thus, all the sheets in the printing apparatus (residual sheet) are discharged to the discharge tray 328. By discharging the residual sheet to the discharge tray 328, the load of jam processing for the user is reduced.

The finisher 109 can carry a large number of sheets discharged from the printing apparatus 107. The finisher 109 includes a conveyance path 331 and a stack tray 332 for stacking sheets. The conveyance path 331 is provided with conveyance sensors 333, 334, 335, 336. The sheet conveyed from the printing apparatus 107 is stacked on the stack tray 332 via the conveyance path 331. The conveyance sensors 333, 334, 335, 336 detect whether the sheet has passed through the conveyance path 331. In a case where the leading edge or the trailing edge of the sheet in the conveying direction is not detected by the conveyance sensor 333, 334, 335, 336 even after a lapse of a predetermined time from the start of conveying the sheet, the CPU 242 determines that a conveyance jam (conveyance failure) has occurred in the finisher 109. In this case, the CPU 242 notifies the printing apparatus 107 that the conveyance jam has occurred. Thus, the finisher 109 detects a sheet conveyance abnormality at the downstream side of the CISs 321 and 322 in the sheet conveyance direction.

<Printing Process>

Figure 5:
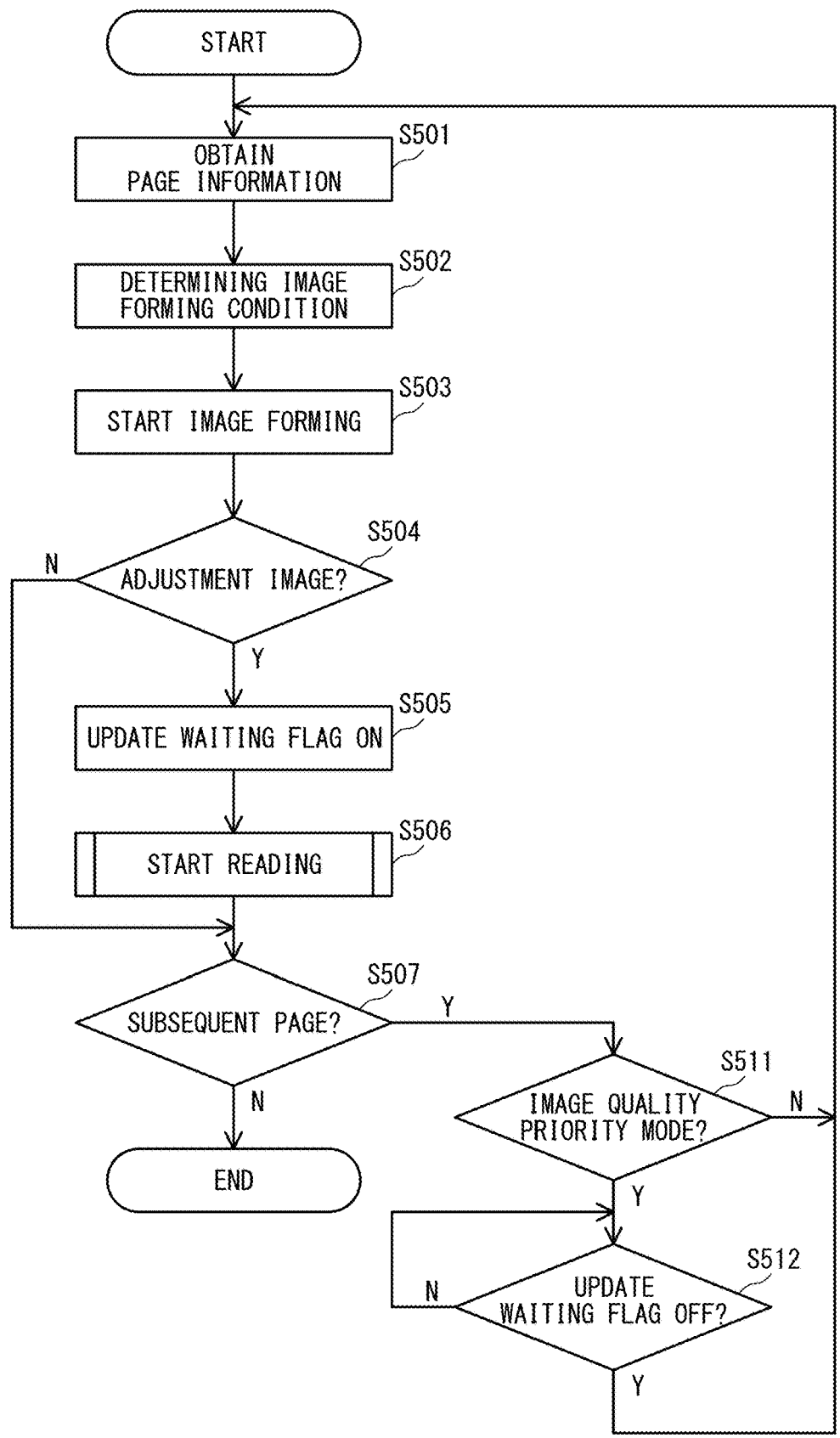
FIG. 5 is a flowchart illustrating a printing process.

FIG. 5 is a flowchart representing the printing process in the image processing system as described above. This process starts when the CPU 222 obtains a print instruction from the operation unit 224 or the client PC 103.

When the CPU 222 starts the printing process, the CPU 222 obtains the page information (Step S501). FIG. 6A illustrates the format of page information used in the image forming apparatus 101. The page information is stored in the memory 223 as a queue. Therefore, the context of each sheet is clarified in the page information. The page information includes page ID, size (sheet width, sheet length), basis weight, sheet type, sheet feeding deck ID indicating the sheet feeding source of the sheet, adjustment image print information, and the like. The adjustment image print information indicates whether or not the adjustment image is printed on the target page.

FIG. 6B is an explanatory diagram of image forming parameter information, which is set for each sheet feeding deck. The image forming parameter information is a parameter (image forming condition) when an image is formed on a sheet to be accommodated in the corresponding sheet feeding deck. The image forming parameter information is stored in the memory 223. When the adjustment image is read, the image forming parameter information is updated based on its reading result. The image forming parameter information includes print position information, density correction information, and the like.

The CPU 222 confirms the sheet feeding deck of the sheet feeding source based on the sheet feeding deck ID included in the obtained page information, refers to the image forming parameter information set in the confirmed sheet feeding deck, and determines the image forming condition (Step S502). The CPU 222 starts image forming based on the determined image forming conditions (Step S503). The CPU 222 determines whether or not the adjustment image is to be printed based on the adjustment image print information included in the obtained page information (Step S504).

In a case where the adjustment image is to be printed (Step S504: Y), the CPU 222 sets an update waiting flag of the image forming condition to an ON state (Step S505). The CPU 222, after setting the update waiting flag set to the ON state, starts the reading process of the adjustment image by the image reading unit 231 (Step S506). The reading process of the adjustment image can be executed in parallel with the printing process. The details of the reading process of the adjustment image will be described later. The update waiting flag of the image forming condition indicates whether or not the reading process of the adjustment image is completed and the image forming condition is updated. During the reading process of the adjustment image described later, the update waiting flag is changed to OFF at the timing when the image forming condition is updated.

The CPU 222 determines, after setting the update waiting flag to the ON state, presence/absence of a subsequent page (Step S507). In a case where the adjustment image is not printed (Step S504: N), the CPU 222 does not perform the processes of Step S505 and Step S506, and determines presence/absence of a subsequent page. In a case where there is no subsequent page (Step S507: N), the CPU 222 ends the printing process.

When there is a subsequent page (Step S507: Y), the CPU 222 determines whether or not an adjustment mode is an image quality priority mode in which image quality is prioritized (Step S511). Details of the adjustment mode setting will be described later. In a case where the image quality priority mode is set (Step S511: Y), the CPU 222 waits until an update waiting flag of the image forming condition becomes an OFF state (Step S512: N). When the update waiting flag becomes the OFF state (Step S512: Y), the CPU 222 returns to the process of Step S501 and performs the printing process of the next page. Ina case where the image quality priority mode is not set (Step S511: N), the CPU 222 determines that the adjustment mode is set to a productivity priority mode in which the productivity is prioritized. In this case, the CPU 222 does not wait until the update waiting flag of the image forming condition becomes the OFF state. In this case, the CPU 222 returns to the process of S501 and performs the printing process of the next page.

Figure 7:
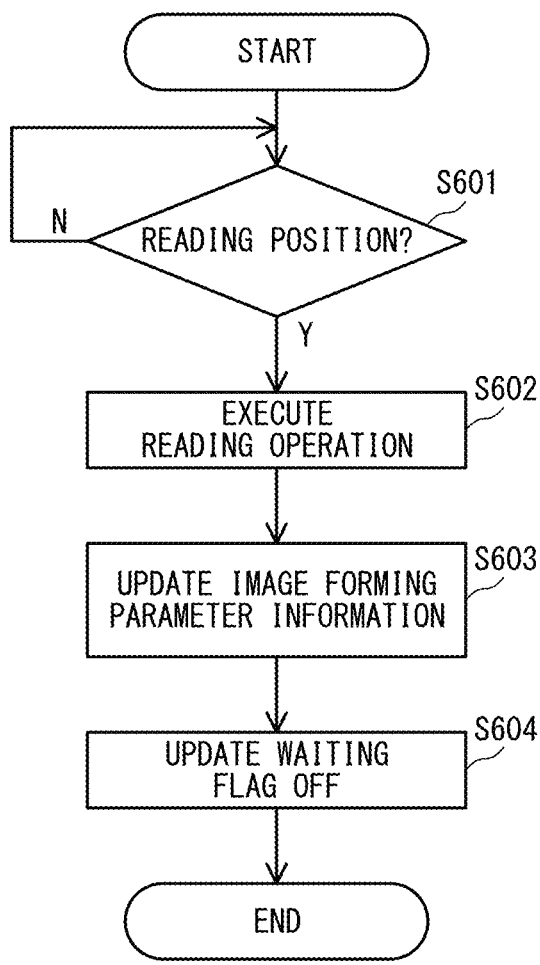
FIG. 7 is a flowchart illustrating an image reading process of an adjustment image.

FIG. 7 is a flowchart representing the reading process of the adjustment image of Step S506.

The CPU 222 waits until the adjustment image of the adjustment chart reaches the reading position of the image reading unit 231 (Step S601: N). The CPU 222 determines whether the adjustment image has reached the reading position or not based on, for example, a timing at which a sensor (not shown) provided in the conveyance path 323 detects the adjustment chart (sheet). When the adjustment image reaches the reading position (Step S601: Y), the CPU 222 executes the reading operation of the adjustment image by the image reading unit 231 (Step S602). The CPU 222 updates the image forming parameter information based on the reading result of the adjustment image read by the image reading unit 231 (Step S603). Here, the CPU 222 confirms whether the sheet feeding deck to which the sheet on which the adjustment image is formed is fed by the sheet information. The CPU 222 updates the image forming parameter information corresponding to the confirmed sheet feeding deck. As a result, the image forming conditions (printing position, image density, and the like) when the sheet is fed from the sheet feeding deck to start the printing process are updated. After updating the image forming parameter information, the CPU 222 sets the update waiting flag of the image forming conditions as the OFF state (Step S604). In this way, the reading process of the adjustment image is completed.

<Adjustment Mode>

Figure 8A:
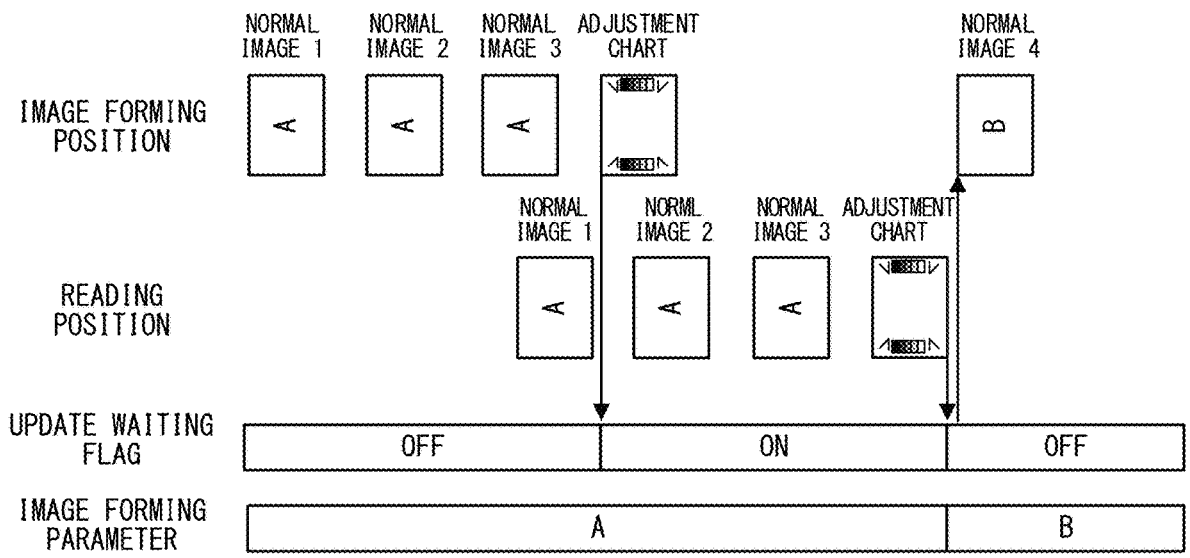
FIG. 8A and FIG. 8B are explanatory diagrams of an adjustment mode.
Figure 8B:
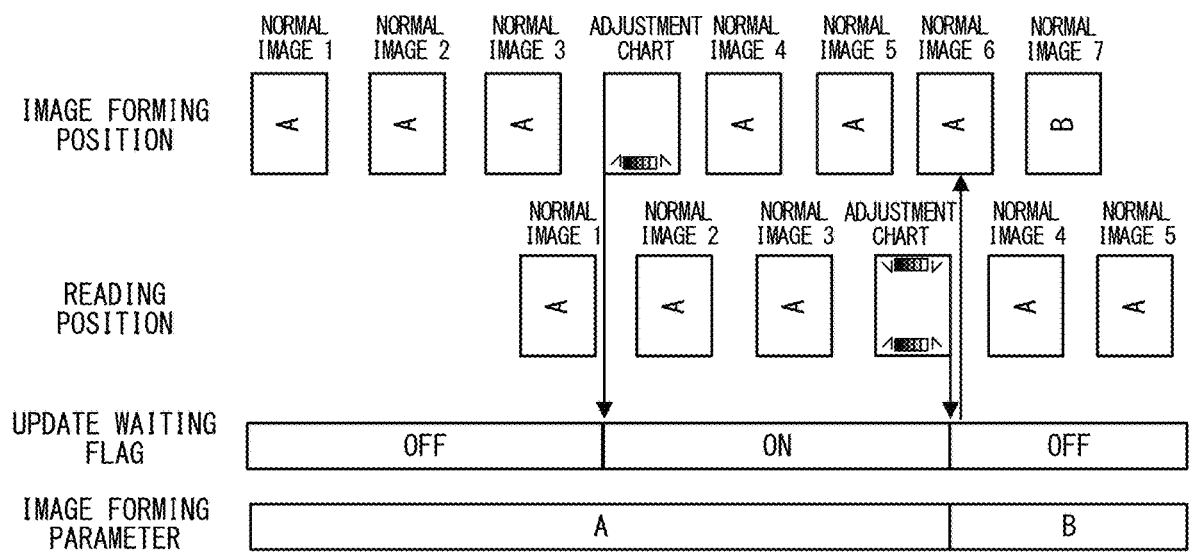

FIG. 8A and FIG. 8B are explanatory views of the adjustment mode. The adjustment mode is an operation mode for updating the image forming condition and includes an image quality priority mode in which maintaining image quality is prioritized and a productivity priority mode in which productivity is prioritized. The adjustment mode is set before or at the start of the printing process. For example, information about the adjustment mode is included in the print instructions obtained from the operation unit 224 or the client PC 103. FIG. 8A is an explanatory diagram of the operation in the image quality priority mode. FIG. 8B is an explanatory diagram of the operation in the productivity priority mode.

In the image quality priority mode (FIG. 8A), when the adjustment image is printed on the sheet to generate the adjustment chart, the update waiting flag of the image forming condition is set to the ON state. In the image quality priority mode, the image forming of the image on the fourth page (normal image 4) is not performed until the update waiting flag is OFF. The update waiting flag is set to the OFF state when the adjustment image is read at the reading position and the image forming parameter information is updated based on its reading result. When the update waiting flag is set to the OFF state, image forming of the image on the fourth page (normal image 4) is performed based on the updated image forming parameter information. Therefore, the image quality of the image is maintained.

In the productivity priority mode (FIG. 8B), when the adjustment image is printed to generate the adjustment chart, the update waiting flag of the image forming condition is set to the ON state, as in the image quality priority mode. In the productivity priority mode, the image forming of the image on the fourth page (normal image 4) is performed in the ON state. Therefore, in this mode, the printing process is performed without waiting for the update waiting flag to be turned off. That is, the image forming of the image on the fourth page (normal image 4) is started without waiting for the update of the image forming parameter information based on the reading result of the adjustment image. As a result, the productivity of the printed matter is prevented from being decreased.

The update waiting flag is set to the OFF state when the adjustment image is read at the reading position and the image forming parameter information is updated based on the reading result. In the productivity priority mode, the image forming parameter information, which is updated by the adjustment image formed after the image of the third page (normal image 3), is applied to the image of the seventh page (normal image 7) at the time of image forming of the seventh page. Therefore, when the update waiting flag is set to the OFF state, the image of the seventh page (normal image 7) is formed based on the updated image forming parameter information.

As described above, when the image quality priority mode is set, based on the updated image forming parameter information (image formation condition), the image formed immediately after the adjustment chart is formed. When the productivity priority mode is set, the image formation parameter information (image formation condition) can be updated without causing downtime. Therefore, according to the instruction of the user, the image forming process can be performed by giving priority to either the image quality or the productivity, and the usability is improved.

FIG. 9A to FIG. 9E are explanatory views of a method of setting the adjustment mode. Here, a description is given for a case where the user sets the adjustment mode by the operation unit 224. FIG. 9A to FIG. 9E are explanatory diagrams representing the setting screen displayed on the display 225 by the CPU 222 when the adjustment mode is set.

Figure 9A:
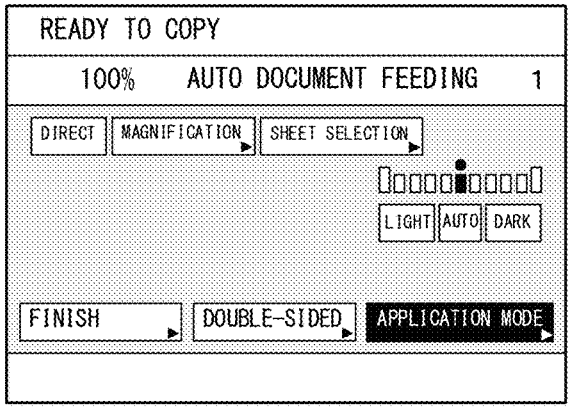
FIG. 9A to FIG. 9E are explanatory diagrams of a setting method of the adjustment mode.
Figure 9B:
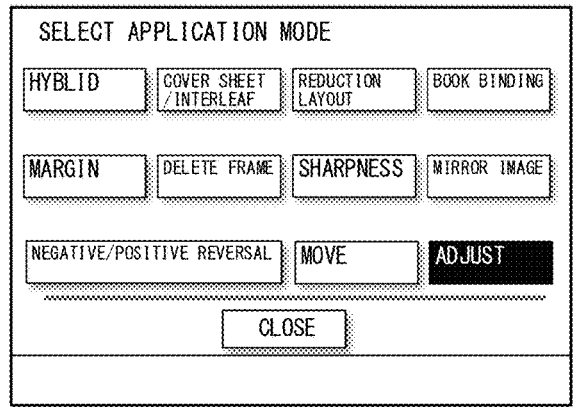
Figure 9C:
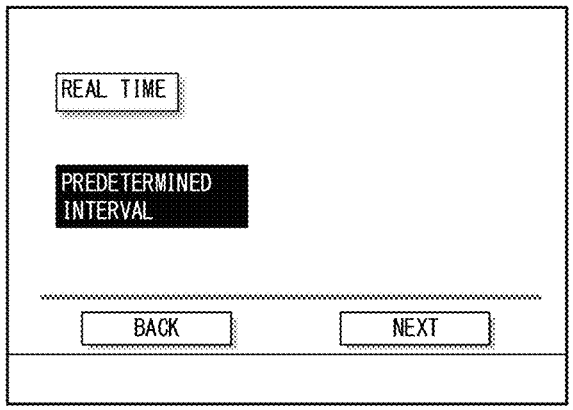

FIG. 9A represents an initial screen. When the user selects a soft key "APPLICATION MODE" in the initial screen, the CPU 222 displays an application mode selection screen, shown in FIG. 9B, on the display 225. When the user selects a soft key "ADJUST" in the application mode selection screen, the CPU 222 displays the adjustment frequency selection screen, shown in FIG. 9C, on the display 225.

When the user selects a soft key "CLOSE" in the application mode selection screen, the CPU 222 displays the initial screen on the display 225.

Figure 9D:
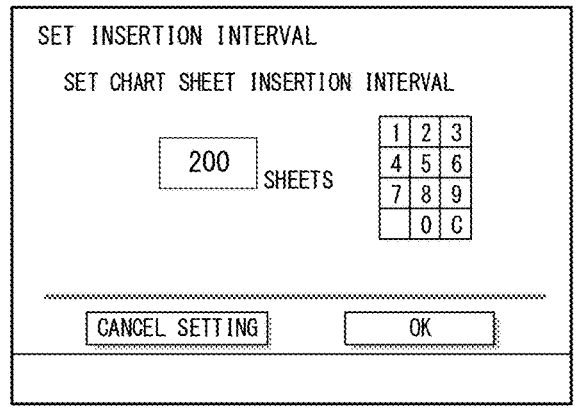

When the user selects a soft key "PREDETERMINED INTERVAL" in the adjustment frequency selection screen, the CPU 222 displays the insertion interval setting screen, which is shown in FIG. 9D, on the display 225. When the user selects a soft key "BACK" in the adjustment frequency selection screen, the CPU 222 displays the application mode selection screen on the display 225.

Figure 9E:
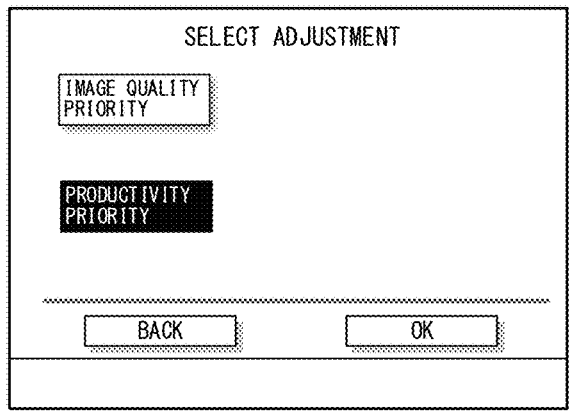

When the user selects a soft key "NEXT" after setting the number of insertion intervals with the numeric keypad in the insertion interval setting screen, the CPU 222 displays the adjustment mode selection screen of FIG. 9E on the display 225. When the user selects a soft key "BACK" in the insertion interval setting screen, the CPU 222 displays the adjustment frequency selection screen on the display 225.

When the user selects one of soft keys "IMAGE QUALITY PRIORITY MODE" and a soft key "PRODUCTIVITY PRIORITY" in the adjustment mode selection screen and then selects a soft key "OK", the CPU 222 sets adjustment mode based on the selection contents. The CPU 222 stores the set adjustment mode in the memory 223. When the user selects the soft key "Back" in the adjustment mode selection screen, the CPU 222 displays the insertion interval setting screen on the display 225.

The external controller 102 instructs the printing apparatus 107 to create the adjustment chart based on the adjustment mode. The adjustment chart is created for every set number of insertion intervals. For example, in a case where "200", i.e., the number of the sheets, is input and the soft key "OK" is selected in the insertion interval setting screen, the printing apparatus 107 is instructed to print the adjustment chart from the external controller 102 every time 200 sheets are printed. In a case where the print job instructs to print 1000 sheets, the printing device 107 generates the adjustment chart between pages 200 and 201, between pages 400 and 401, between pages 600 and 601 and between pages 800 and 801. When the CPU 222 is instructed to create the adjustment chart, the CPU 222 confirms the adjustment mode stored in the memory 223 to perform processing according to the set adjustment mode.

As described above, the image forming apparatus 101 determines whether or not to perform, immediately after generating the adjustment chart, the image forming according to a normal print job based on the adjustment mode. When the adjustment mode is the image quality priority mode, the image forming apparatus 101 does not perform next normal image forming until the image formation conditions are updated. When the adjustment mode is the productivity priority mode, the image forming apparatus 101 performs the next normal image forming without waiting for the update of the image formation conditions. In the image forming apparatus 101, the adjustment mode is set by the user, therefore, it is possible to select whether to maintain the image quality when the image formation conditions are updated or to prevent a decrease in productivity, thereby improved usability is provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-087137, filed May 19, 2020, which is hereby incorporated by reference herein in its entirety.

What is claimed is:

1. An image forming apparatus comprising:
an image forming unit configured to form an image based on an image forming condition;
a reading unit configured to read a test image on a sheet;
a controller configured to:
control the image forming unit to form the test image while a plurality of images is formed by the image forming unit, the test image and the plurality of images being formed on separate sheets;
obtain read data related to the test image output from the reading unit is formed; and
update the image forming condition based on the read data,
wherein the controller operates in a first mode and a second mode,
wherein the first mode is a mode in which, in a case where the test image is formed between an image for a first sheet and an image for a second sheet which is subsequent to the first sheet, the controller controls the image forming unit to form the image for the second sheet after the image forming condition is updated based on the reading data related to the test image, and
wherein the second mode is a mode in which, in a case where the test image is formed between an image for a third sheet and an image for a fourth sheet which is subsequent to the third sheet, the controller controls the image forming unit to start forming of the image for the fourth sheet before the image forming condition is updated based on the reading data related the test image.

2. The image forming apparatus according to claim 1,
wherein the controller receives user instruction information instructing forming of the test image, and
wherein the controller selects the first mode or the second mode based on the user instruction information.

3. The image forming apparatus according to claim 1, wherein the controller is configured to:
control, in a case where image quality is prioritized, the image forming unit to form the image on the subsequent sheet in the first mode; and
control, in a case where productivity is prioritized, the image forming unit to form the image on the subsequent sheet in the second mode.

4. The image forming apparatus according to claim 1, further comprising an operation unit to set one of the first mode and the second mode.

5. The image forming apparatus according to claim 1, wherein the controller is configured to set, after starting forming of the adjustment image by the image forming unit, a flag representing whether or not the image forming condition is updated or not, to a first state to:
control the image forming unit to not perform image forming, in a case where the controller operates in the first mode, on the subsequent sheet until the flag becomes a second state; and
control the image forming unit to perform image forming, in a case where the controller operates in the second mode, on the subsequent sheet without waiting until the flag becomes the second state.

6. The image forming apparatus according to claim 5, wherein the controller is configured to set the flag to the second state upon updating the image forming condition.

7. The image forming apparatus according to claim 1, further comprising:
a plurality of sheet feeding decks to accommodate the sheet;
a first memory to store page information including information which represents a sheet feeding source of the sheet; and
a second memory to store the image forming conditions, each of which is set for each of the plurality of the sheet feeding deck,
wherein the controller is configured to confirm, based on the page information, the sheet feeding source on which the test image is formed to update the image forming condition corresponding to the confirmed sheet feeding source.

8. The image forming apparatus according to claim 1,
wherein the image forming unit forms the test image on both sides of the sheet,
wherein the reading unit includes:
a first reading sensor configured to read the test image formed on the first surface of the sheet,
a second reading sensor configured to read the test image formed on the second surface of the sheet,
wherein the controller is configured to update the image forming condition based on the reading result of the first reading sensor and the reading result of the second reading sensor.

9. The image forming apparatus according to claim 1, wherein both the first reading sensor and the second reading sensor are optical sensors.

* * * * *